July 1, 1924.
A. SEGUIN
1,499,881
APPARATUS FOR MEASURING SPEED
Filed May 31, 1921  4 Sheets-Sheet 1
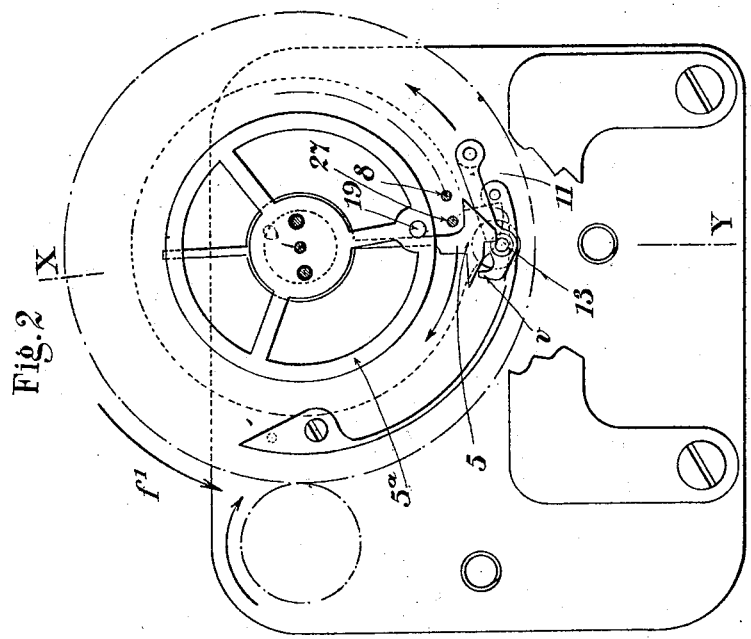
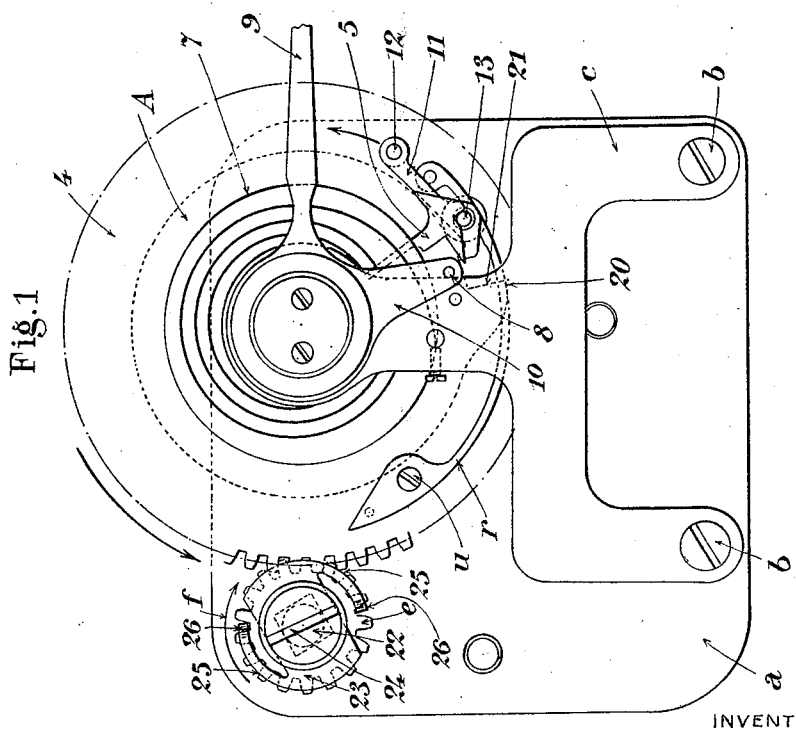
INVENTOR.
Augustin Seguin
By
his ATTORNEY.

July 1, 1924.
A. SEGUIN
APPARATUS FOR MEASURING SPEED
Filed May 31, 1921
1,499,881
4 Sheets-Sheet 2
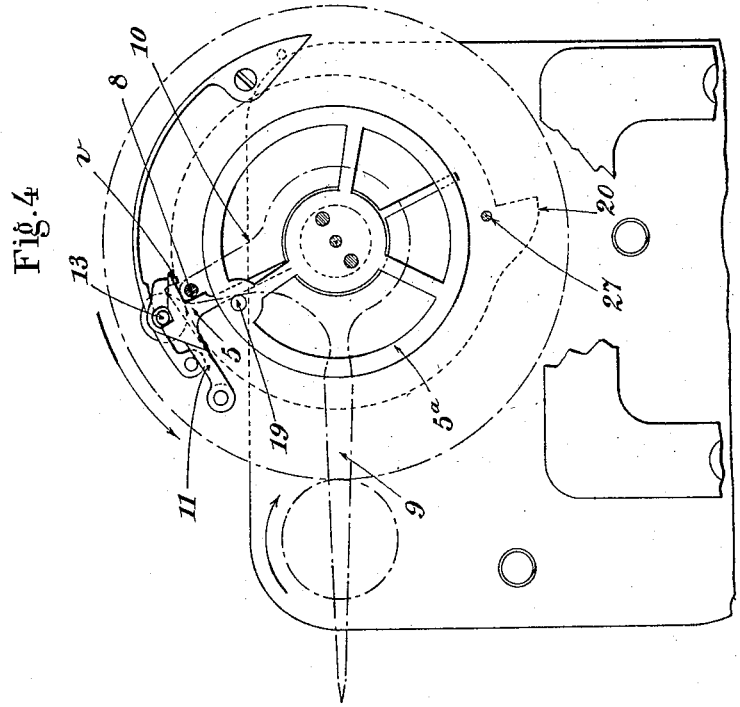
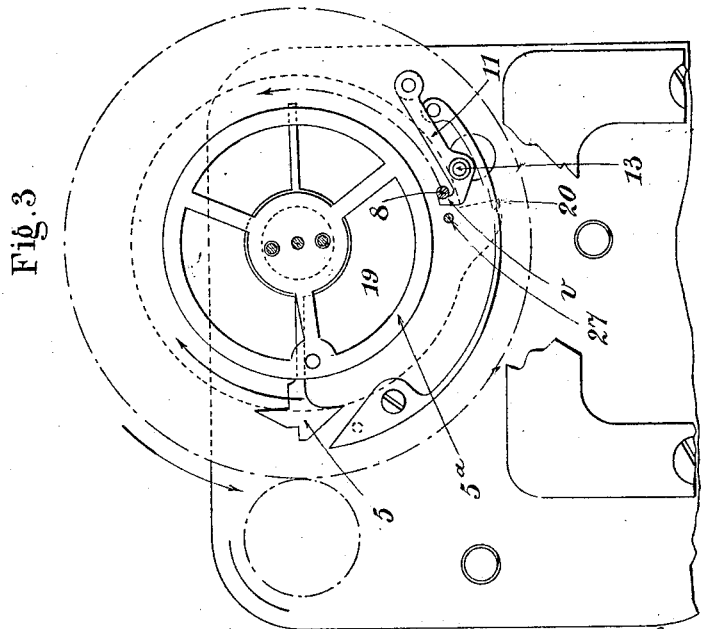
INVENTOR:
Auguslin Seguin
By
his ATTORNEY.

July 1, 1924.  
A. SEGUIN  
1,499,881  
APPARATUS FOR MEASURING SPEED  
Filed May 31, 1921  
4 Sheets-Sheet 3
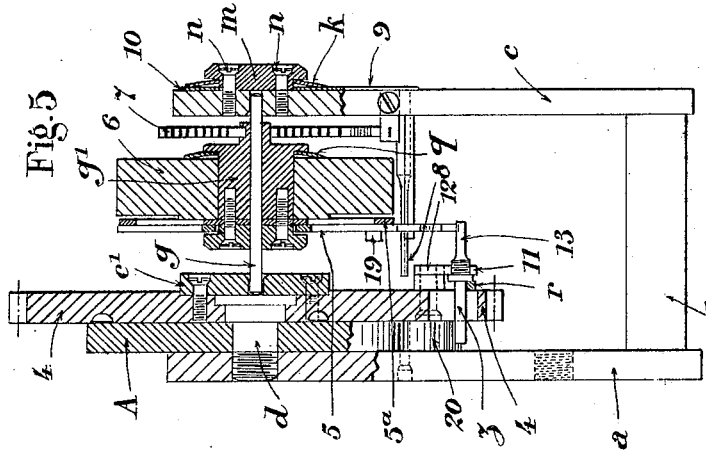
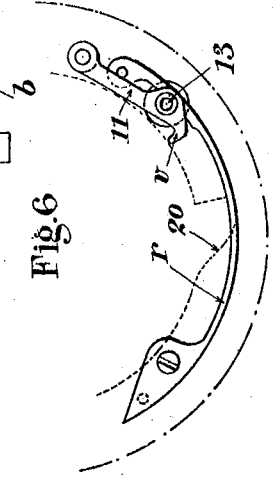
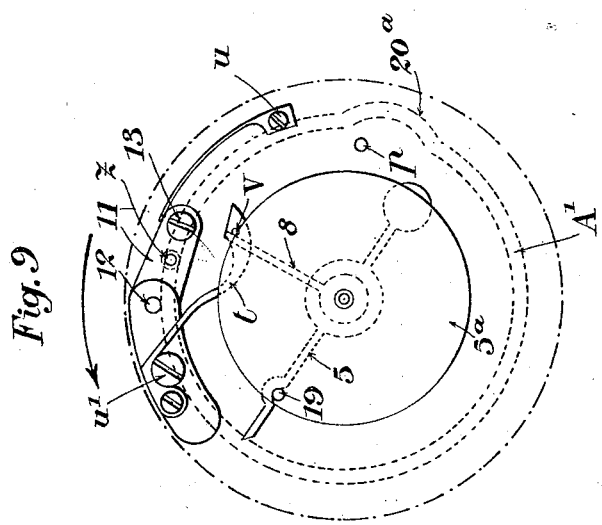
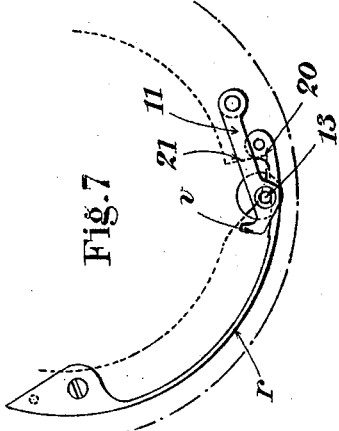
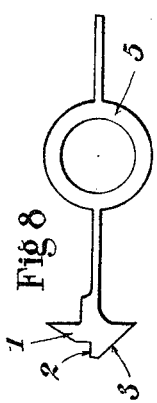
INVENTOR:  
Augustin Seguin  
By  *(signature)*  
his ATTORNEY.

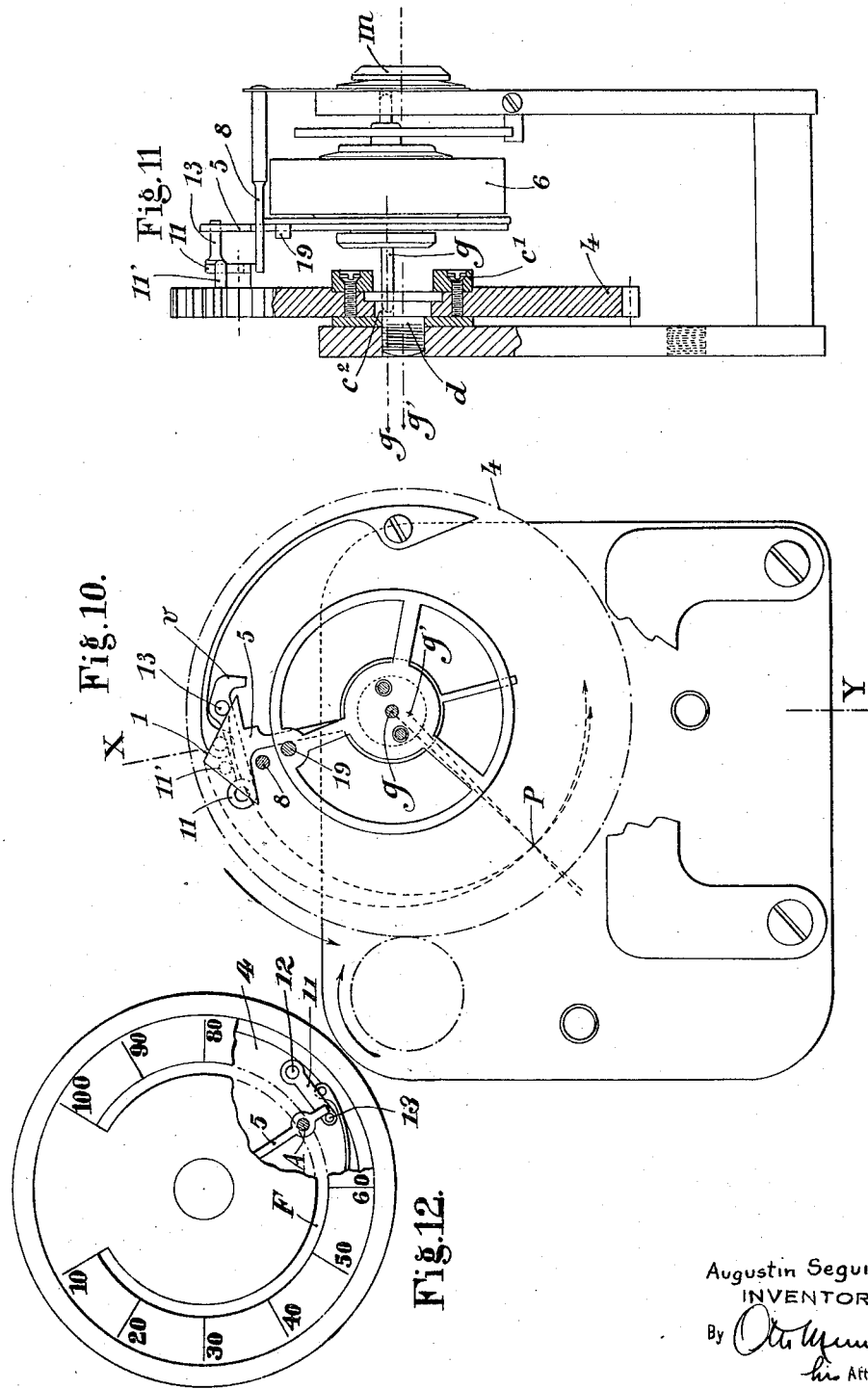

Patented July 1, 1924.

1,499,881

UNITED STATES PATENT OFFICE.

AUGUSTIN SEGUIN, OF PARIS, FRANCE.

APPARATUS FOR MEASURING SPEED.

Application filed May 31, 1921. Serial No. 473,822.

*To all whom it may concern:*

Be it known that I, AUGUSTIN SEGUIN, citizen of the French Republic, residing at Paris, in the Republic of France, have invented new and useful Improvements in Apparatus for Measuring Speed, of which the following is a specification.

This invention relates to an apparatus for the measurement of speed of the type specified in my preceeding patent application Ser. No. 384,101, filed on May 25th, 1920; that is, an apparatus wherein the speed is indicated by the meeting point of a member which is caused to rotate exclusively in one direction and at a speed which is proportional to the speed to be measured, with a second member possessing a speed of constant law and which is independent of the speed to be measured.

My invention relates to different practical forms of construction of the various parts of the apparatus whereby an exact and reliable operation is obtained. One of the essential features of this invention consists in a small lever secured to the wheel which rotates at a speed proportional to the speed to be measured, said lever being pivoted in a resilient manner upon an axle perpendicular to the plane of the said wheel and being provided with a stud which constitutes the movable portion rotating at a speed which is proportional to the speed to be measured, whereas the movable member which is operated at a speed of different and constant law is constituted by a striker actuated in one direction by a balance wheel, the said lever being used for actuating the said striker in the other direction and for actuating the indicating pointer. Another important characteristic consists in the disposition of the said balance wheel upon the axis thereof, and another characteristic relates to the arrangements provided in the apparatus for permitting the momentary back motion of the part whose speed is to be measured without injuring the indicating apparatus.

The accompanying drawings show by way of example various embodiments of this invention, wherein:

Fig. 1 is a plan view of the apparatus, with the graduated dial not shown.

Figs. 2, 3 and 4 indicate the different positions of the parts in movement.

Fig. 5 is a section on the line X—O—Y, Fig. 2.

Figs. 6 and 7 show two different positions of the swinging member.

Fig. 8 is a plan view of the striker.

Fig. 9 is a plan view of a modified form of the apparatus.

Figs. 10 and 11 are respectively a plan view and a side view of a modification.

Fig. 12 is a plan view of another modification.

The apparatus comprises the plate $a$, a bridge piece which is constituted by the two uprights $b$, and the plate $c$ having mounted within the same the various movable parts. In the plate $a$ is disposed a screw $d$ (Fig. 5) having disposed thereon a gear wheel 4 which is actuated at a speed proportional to the speed to be measured, through the medium of the pinion $e$. Upon the gear wheel 4 is secured a member $c^1$ having therein a central aperture. An axle $g$ is journaled at one end thereof in the said aperture and at the other end in the member $c$. Upon the outer face of the plate $c$ is disposed the indicating pointer 9, the portion thereof which is situated at the center of the apparatus being provided with an extension 10 having secured thereto an arm 8 which is perpendicular to the plane of the said pointer.

The balance wheel 6 is mounted with a tight friction fit upon the axle thereof. A thin convex steel washer $q$ (Fig. 5) secured to a shoulder of the sleeve $g^1$ in frictional contact with the said balance wheel normally prevents this arm from rotating. Upon the axle $g$ of the rocker arm is mounted a disc $5^a$ (Fig. 5), this disc being secured to the said axle. Upon this same axle is disposed with easy friction a striker 5 (Fig. 5) which enters in contact with the stud 19 of the disc $5^a$; the said stud being adapted to drive the striker 5 in the direction of the arrow $f^1$ (Figs. 2 to 4). Upon the gear wheel 4 is pivoted at 12 a small lever 11 the end whereof which is farthest from the pivot having the form of a hook $v$. The said lever is impelled by a spring $r$ secured at $u$ to the gear wheel 4. The hook $v$ is adapted to make contact with the arm 8 in order to actuate the indicating pointer 9 in the direction of the arrow $f^1$ (Fig. 2).

The lever 11 has secured to the lower side thereof a stud $z$ (Figs. 3 and 5) which bears upon a circular cam A provided with a boss 20. The pivoted lever 11 has likewise mounted upon the upper side thereof a stud 13 adapted to encounter the striker 5. The striker 5 (Fig. 8) is provided with an inclined ramp 1, a stop portion 2 and a second inclined ramp 3.

The operation of the apparatus is as follows:

The gear wheel 4 is forwardly driven, that is, in the direction of the arrow, by means of the pinion $e$, at a speed which is proportional to the speed to be measured. The gear wheel 4 drives the lever 11 during the movement of rotation thereby causing the stud 13 (Fig. 1) to bear against the striker 5 and then to mount upon the ramp 1, to bear against the portion 2 and then to drive the striker. Inasmuch as the striker 5 is in contact with the stud 19 of the disc 5$^a$ secured to the said balance wheel, the spring of this latter will be thereby bent. When the stud $z$ encounters the boss 20 of the cam A, the lever 11 is caused to swing outwardly and the stud $z$ will release the striker 5 (Fig. 2), thereby disengaging the balance wheel. The striker 5 is arrested at this moment by a stop piece 27 in order to prevent this latter from being drawn too far and from thus entering again into contact with the stud 13 which would have come again into inoperative position, before the rearward movement of the rocker arm takes place. After said rocker arm has been given a greater or less forward movement according to the speed to be measured, it then commences a rearward movement, in the opposite sense to the arrow, and again enters in contact with the striker 5, drawing this latter along in the rearward movement by means of the stud 19.

Inasmuch as the arm 8 now occupies an angular position corresponding to the speed of the gear wheel 4 as will be hereinafter set forth, if the speed of the gear wheel 4 during the rotation in question should exceed that which corresponds to the angular position of the arm 8, the hook $v$ will encounter the arm 8 actuating the said pointer before the striker 5 on its backward movement has itself encountered the said arm, and the hook $v$ will thus draw the pointer in the direction of the arrow, as shown in Fig. 3, until the ramp 1 of the striker 5 is engaged beneath the stud 13 and drives the swinging lever away from the centre (Fig. 4). At this moment the hook $v$ is disengaged from the arm 8, and the pointer now remains held by friction in the new position into which it has been brought. The return movement of the balance wheel in the opposite direction to that indicated by the arrow will take place under the action of the spring 7 of the balance wheel at a speed which is always uniform, and therefore the new position of the pointer will correspond to the newly attained speed of the gear wheel 4, and if the dial of the apparatus is suitably graduated, the pointer will indicate this latter speed.

The striker 5 is stopped during the rearward rotation thereof by the stud 13 of the lever 11 and is now drawn forward by the gear wheel through the medium of the said stud. When the stud $z$ moves over the boss 20 of the cam, the balance wheel is again disengaged and will move rearwardly as in the preceding case, whereas the swinging lever 11 will continue its forward motion. If on this occasion the speed has become reduced, the striker 5 will encounter the arm 8 before the hook $v$ has reached the said arm, and the arm 8 together with the pointer 9 will be moved rearwardly until the stud 13 arrests the striker 5 and again draws the latter forward. At the same time the ramp 1 of the striker 5 has moved the swinging lever 11 in such manner that the hook $v$ will move out of reach of the end of the arm 8 and will thus have no effect upon the indicating pointer. The pointer 9 will now indicate the new speed of the wheel 4 and consequently of the moving part to be observed.

Should the speed remain constant, the stud 13 will arrest the striker 5 at the moment when this latter was about to draw back the pointer, and the ramp 1 will remove the swinging lever 11 at the moment when the same was about to draw forward the pointer, and in this manner the pointer will not be actuated but will continue to indicate the same speed as before (Fig. 4). In all cases the position of the pointer is determined by the moment of contact of the striker 5 with the stud 13, which constitute two movable members having a contrary displacement. The disposition of the said balance wheel which is mounted by friction upon its axle as hereinbefore described, affords a considerable advantage in absorbing the shocks, obviating rebounds and rendering the operation easier as well as more exact and noiseless. A suitable stop piece may be provided to prevent the said balance wheel from effecting an undue degree of rotation by reason of inertia.

The pointer 9 is braked by means of a convex steel disc $k$ which is caused to bear against the contact member $m$ secured to the member $c$ by the two screws $n$. This braking action of the pointer by the steel disc $k$ is intended to prevent any movement of the pointer which may arise from the effect of jarring of the apparatus and to obviate any impelling action of the pointer by momentum during the speed variations to limit the movement of the arm 8 to the variations of position of the contact points of the striker 5 with the stud 13.

In this apparatus, provision is also made for the back motion of the gear wheel 4, that is, of the part whose speed is to be measured, in case such part should happen to be driven momentarily in the direction opposite to that of its normal rotation. In this case, the stud $z$, which enters in contact with the abrupt portion of the cam A would in fact be sheared off, but this effect is obviated by providing a loose wheel mounting for the gear wheel $e$. To this effect, the pinion $e$ is mounted loose upon the axle 22 and is actuated by means of a flat steel spring 23 disposed at the end of the axle 22 and secured thereto by the screw 24. The said spring is cut out as shown in Fig. 1 to form two tongues 25 whose curved end 26 is adapted to move downwardly and to engage between two consecutive teeth of the pinion $e$. During the rotation in the direction of the arrow, $f$, the said spring will actuate the pinion $e$ by means of its end portions 26, but upon the rotation in the contrary sense, that is, in the event of back motion, the tongues 25 will act as a pawl and will move without actuating the pinion $e$, the latter being held fast by the gear wheel 4 which is arrested by the stud $z$ in contact with the portion 21 of the said cam.

Furthermore, should the back motion commence after the said striker has again moved rearwardly (Fig. 2) but before the moment at which the stud $z$ has dropped outside of the boss 20 of the cam, the stud $z$ together with the swinging lever and the stud 13 will rotate in the contrary sense to the arrow $f^1$ in order to follow the striker. This latter is provided with the ramp 3 in such manner that upon the encounter of the stud 13 with the striker 11 the former will mount upon the ramp 3 and will move to the other side of the striker. The stud $z$ will then enter in contact with the portion 21 of the said cam, and the loose wheel arrangement of the pinion $e$ will operate as in the preceding case.

Figs. 6 and 7 show the swinging lever 11 in two of the successive positions thereof. In Fig. 6 the said lever is in the more usual position, wherein it is acted upon solely by the spring $r$ (Fig. 3), the hook $v$ actuating the arm 8. When the stud 13 mounts upon the ramp 1 in order to disengage the arm, it is necessary that this action should take place by an easy and gradual movement. In fact, at this moment the spring is caused to bear by the end thereof upon the lever 11, thus acting throughout its entire length and with the maximum degree of elasticity. On the contrary, in the position shown in Fig. 7, the stud $z$ mounts upon the boss 20 of the cam, and it is here necessary to provide for the sudden drop of the said stud upon passing over the portion 21, for the swinging lever 11 now moves to a greater extent than in the preceding case. But at this final moment the spring will no longer act throughout its entire length upon the said lever, but will act for a shorter length upon the stud $z$, so that its action is correspondingly more sudden.

In the apparatus shown in Fig. 9, the arm 8 of the indicating member is not actuated by the hook of the lever 11, but by means of a pin V disposed upon the spring $t$ which is secured at $u^1$ to the gear wheel 4, the stud $z$ being disposed in a groove $A^1$ provided with a boss $20^a$. The operation of this apparatus is the same as in the preceding case. The stud 13 draws along the striker which now becomes disengaged and moves rearwardly together with the balance wheel which has a friction mounting upon the disc $5^a$, when the stud $z$ passes over the boss $20^a$. During the return movement of the striker and the balance wheel, the pin V will actuate the arm 8 of the pointer, and the disengagement of the arm 8 will take place when the stud 19 of the disc $5^a$ used for drawing the striker is caused to move under the rounded portion of the spring $t$ which is thereby raised. In this case the stud 19 has the same function as the ramp 1 of the striker in the preceding apparatus. In order that the striker 5 after being disengaged from the stud 13 of the lever 11 by the movement of boss $20^a$ may be prevented from being again engaged before effecting its return movement, a stop piece $p$ has been provided for limiting the motion of the same in the direction of the arrow.

It will be observed that it is not necessary in order to obtain an exact working of the apparatus that the two movable parts 5 and 13 shall occupy exactly the same angular position when starting in the contrary sense to encounter the arm 8 actuating the pointer, but the said parts may be located at two different points, this case occurring chiefly at high speeds by reason of the momentum of the balance wheel 6 which when disengaged will impel the disc $5^a$ somewhat beyond the stud 13 in the direction of the arrow, before the said balance wheel shall proceed rearwardly under the action of its spring. This motion of the balance wheel due to inertia will likewise have a tendency to render the graduations of the dial more equal and may be employed expressly for this purpose. As a matter of fact, in an apparatus wherein the balance wheel cannot be driven by the action of momentum beyond its point of release, said point corresponds to infinitely high speeds, and the graduations on the dial near said point of release of the balance wheel, are closer and closer to each other. On the contrary if provision is made, to allow the balance wheel to rotate beyond its point of release from the swinging lever, while the balance wheel will first stop and then will rotate backwards and reach again its normal point of release, the lever 11 will have come again to said point, and this for speeds pratically obtainable. The space between two adjacent graduations on the dial remains finite, and according to the tension of the spiral spring 7, it will be possible to have equally spaced graduations on the dial.

The disengagement of the arm 5 of the fly wheel may also be obtained by an eccentric disposition of the axle of the balance wheel with reference to the axle of the driving wheel 4, as shown on Figs. 9 and 10. In this case the cam 20 and the stud $z$ are omitted; the disc $c^1$ is provided with a wide central aperture so that the axle $g$ of the balance wheel 6 may rotate in a bore $c^2$ in the head of the screw $d$ and eccentered with respect to the axis $g'$ of said screw. Moreover the swinging movement of the lever 11 is limited towards the periphery of the wheel 4 by a stop piece 11' and the inclined ramp 1 of the striker 5 has a sufficient length to permit said ramp to meet the stud 13 even for the position in which said stud is farthest from the vertex of the pointer (Fig. 9). During the operation when the stud 13 meets the ramp 1, the lever 11 is caused to pivot and is stopped by 11', and the balance wheel, with the striker, is wound up until the striker is released from the stud 13 when the latter passes over the striker, at the point P, by reason of the eccentricity of the circular path of the striker 5 with respect to the circular path of the stud 13.

In the modification shown in Fig. 12, the indication of the speed is given by the striker 5 itself. The pointer 9 and the hook $v$ of the lever 11 are omitted. The winding up and releasing of the striker 5 may be obtained either by means of the cam 20 and stud $z$ or by the eccentered disposition of the axis $g$ and $g'$ as above described. But the striker 5 is provided with a pointer A, having any desired shape, and of a luminous nature, said pointer moves, along the graduation carried by the dial, within a slot F. When the striker 5 encounters the stud 13, i. e. for the position indicating the speed, the direction of its movement is changed and said striker remains stationary for a very short time and consequently the pointer A' is more visible than for the remainder of the time.

Having now described my invention, what I claim as new and desire to secure by Letters Patent is:

1. An apparatus for the measurement of speed comprising in combination: a driving member operable at a speed proportional to the speed to be measured, an antagonistic movable member frictionally mounted on its axle, a striker loosely mounted on said axle, means whereby said striker may drive said antagonistic member and reciprocally, means for rotating said antagonistic member and said striker in the opposite direction to that of the speed to be measured, indicating means adapted to be operated by said driving member and by said striker respectively, means for rotating said striker and said antagonistic member in the direction of the speed to be measured, means for disengaging said striker from the driving member, means adapted to couple said driving member with the indicating means, means including said striker for disengaging the indicating means from the driving member.

2. An apparatus for the measurement of speed comprising in combination: a driving member operable at a speed proportional to the speed to be measured, a balance wheel, frictionally mounted on its axle, a striker loosely mounted on said axle, means whereby said striker may drive said balance wheel and reciprocally, a spiral spring adapted to actuate the balance wheel in the opposite direction to that of the speed to be measured, indicating means adapted to be operated by said striker in said opposite direction, a swinging lever pivoted on said driving member and adapted to drive the indicating means and the striker in a direction of the speed to be measured, means for disengaging said striker from the swinging lever, yielding means for returning said swinging lever to position and interengaging means on said swinging lever and said striker whereby the indicating means is disengaged from the striker when said striker meets said swinging lever.

3. An apparatus for the measurement of speed comprising in combination: a driving member operable at a speed proportional to the speed to be measured, a balance wheel frictionally mounted on its axle, a striker loosely mounted on said axle, means whereby said striker may drive said balance wheel and reciprocally, a spiral spring adapted to actuate the balance wheel in the opposite direction to that of the speed to be measured, indicating means adapted to be operated by said striker in said opposite direction, a swinging lever pivoted on said driving member and adapted to drive the indicating means and the striker in a direction of the speed to be measured, means for disengaging said striker from the swinging lever, means comprising a fixed abutment to stop said striker at the end of its rotation, in the direction of the speed to be measured, yielding means for returning said swinging lever to position and interengaging means on said swinging lever and said striker whereby the indicating means is disengaged from the striker when said striker meets said swinging lever.

4. An apparatus for the measurement of speed comprising in combination: a driving member operable at a speed proportional to the speed to be measured, a balance wheel frictionally mounted on its axle a striker loosely mounted on said axle, means whereby said striker may drive said balance wheel and reciprocally, a spiral spring adapted to actuate the balance wheel in the opposite direction to that of the speed to be measured, indicating means adapted to be operated by said striker in said opposite direction, a swinging lever pivoted on said driving member, means on said swinging lever adapted to drive the indicating means in a direction of the speed to be measured, a stud provided on the upper face of said swinging lever and adapted to slide on a ramp provided on said striker and then come in contact with a radial part of said striker, whereby said swinging lever is raised to release the indicating means and then drive the striker, yielding means for returning said swinging lever, a second stud secured to the lower face of said swinging lever to position, a fixed cam adapted to raise said second stud whereby said striker is disengaged from said swinging lever, means comprising a fixed abutment to stop said striker at the end of its rotation, in the direction of the speed to be measured, and means permitting the rearward rotation of the driving member.

5. An apparatus for the measurement of speed comprising in combination: a driving member operable at a speed proportional to the speed to be measured, a balance wheel frictionally mounted on its axle, a striker loosely mounted on said axle, means whereby said striker may drive said balance wheel and reciprocally, a spiral spring adapted to actuate the balance wheel in the opposite direction to that of the speed to be measured, indicating means adapted to be operated by said striker in said opposite direction, a swinging lever pivoted on said driving member, means on said swinging lever adapted to drive the indicating means in a direction of the speed to be measured, a stud provided on the upper face of said swinging lever and adapted to slide on said striker and then come in contact with a radial part of said striker, whereby said swinging lever is raised to release the indicating means and then drives the striker, an elongated spring secured on the driving member and adapted to act upon said swinging lever by its all length and by a part only of its length successively, during the raising of said swinging lever, a second stud secured to the lower face of said swinging lever, a fixed cam adapted to raise said second stud whereby said striker is disengaged from said swinging lever, means comprising a fixed abutment to stop said striker at the end of its rotation in the direction of the speed to be measured, and means permitting the rearward rotation of the driving member.

6. An apparatus for the measurement of speed comprising in combination: a driving member operable at a speed proportional to the speed to be measured, a balance wheel frictionally mounted on its axle, a striker loosely mounted on said axle, means whereby said striker may drive said balance wheel and reciprocally, a spiral spring adapted to actuate the balance wheel in the opposite direction to that of the speed to be measured, indicating means frictionally mounted and adapted to be operated by said striker in said opposite direction, a swinging lever pivoted on said driving member and adapted to drive the indicating means and the striker in a direction of the speed to be measured, means for disengaging said striker from the swinging lever, yielding means for returning said swinging lever to position interengaging means on said swinging lever and said striker whereby the receptive member is disengaged from the striker when said striker meets said swinging lever and means permitting the rearward rotation of the driving member.

7. An apparatus for the measurement of speed comprising in combination: a driving member operable at a speed proportional to the speed to be measured, a balance wheel frictionally mounted on its axle and eccentered with reference to the axle of rotation of said driving member, a striker loosely mounted on said axle of the balance wheel, means whereby said striker may drive said balance wheel and reciprocally, a spiral spring adapted to actuate the balance wheel in the opposite direction to that of the speed to be measured, indicating means adapted to be operated by said striker in said opposite direction, a swinging lever pivoted on said driving member, means on said swinging lever adapted to drive the indicating means in a direction of the speed to be measured, a stud secured to said driving member and adapted to come in contact with a radial part of the striker and thus drive said striker, and to release said striker when the latter is in its lowest position with reference to said stud, means for disengaging said indicating means from the swinging lever, and a fixed abutment adapted to stop said striker at the end of its rotation in the direction of the speed to be measured.

8. An apparatus for the measurement of speed comprising in combination: a driving member operable at a speed proportional to the speed to be measured, a balance wheel frictionally mounted on its axle, a striker loosely mounted on said axle, means whereby said striker may drive said balance wheel and reciprocally, a spiral spring adapted to actuate the balance wheel in the opposite direction to that of the speed to be measured, indicating means adapted to be operated by said striker in said opposite direction, a curved spring adapted to drive said indicating means in a positive direction, separate means on the driving member to drive the striker in said direction of the speed to be measured, means for disengaging said indicating means from the driving member, and means for disengaging said striker from said driving member.

9. An apparatus for the measurement of speed comprising in combination: a driving member operable at a speed proportional to the speed to be measured, a balance wheel frictionally mounted on its axle, a striker loosely mounted on said axle, means whereby said striker may drive said balance wheel and reciprocally, a spiral spring adapted to actuate the balance wheel in the opposite direction to that of the speed to be measured, indicating means adapted to operated by said striker in said opposite direction, a curved spring adapted to drive said indicating means in the direction of the speed to be measured, a swinging lever pivoted on the driving member, a stud secured on the upper face of said swinging lever and adapted to drive the striker, a pin provided on the balance wheel adapted to come in contact and raise the curved portion of said curved spring whereby the indicating means will be disengaged from the driving member, a second stud secured on the lower face of the swinging lever and adapted to slide inside a groove provided with a projection, whereby the swinging lever will be raised and the striker will be disengaged from the swinging lever, and means permitting the rearward rotation of the driving member.

10. An apparatus for the measurement of speed comprising in combination: a driving member operable at a speed proportional to the speed to be measured, an antagonistic movable member frictionally mounted on its axle, a striker loosely mounted on said axle, means whereby said striker may drive said antagonistic member and reciprocally, means for rotating said antagonistic member and said striker in the opposite direction to that of the speed to be measured, indicating means adapted to be operated by said driving member and by said striker respectively, means for rotating said striker and said antagonistic member in the direction of the speed to be measured, means for disengaging said striker from the driving member, means adapted to couple said driving member with the indicating means, means including said striker for disengaging the indicating means from the driving member, a driving shaft, a toothed wheel mounted loosely on said shaft and actuating said driving member and a flat spring secured on the end of said shaft and provided with tongues adapted to act as pawls with reference to the teeth of said toothed wheel.

11. An apparatus for the measurement of speed comprising in combination: a driving member operable at a speed proportional to the speed to be measured, an antagonistic movable member frictionally mounted on its axle, a striker loosely mounted on said axle, means whereby said striker may drive said antagonistic member and reciprocally means for rotating said antagonistic member and said striker in the opposite direction to that of the speed to be measured, means on the driving member for driving said striker and said antagonistic member in a direction of the speed to be measured, means for disengaging said striker from the driving member, a luminous pointer provided on said striker, and means permitting the rearward rotation of the driving member.

In testimony whereof I have signed my name to this specification.

AUGUSTIN SEGUIN.